United States Patent
Caldwell et al.

(10) Patent No.: US 10,972,606 B1
(45) Date of Patent: Apr. 6, 2021

(54) TESTING CONFIGURATION FOR ASSESSING USER-AGENT COMMUNICATION

(71) Applicant: Language Line Services, Inc., Monterey, CA (US)

(72) Inventors: Adam Caldwell, Carmel Valley, CA (US); James Boutcher, Carmel, CA (US); Jeffrey Cordell, Carmel, CA (US); Jordy Boom, Marina, CA (US)

(73) Assignee: Language Line Services, Inc., Monterey, CA (US)

( * ) Notice: Subject to any disclaimer, the term of this patent is extended or adjusted under 35 U.S.C. 154(b) by 0 days.

(21) Appl. No.: 16/702,949

(22) Filed: Dec. 4, 2019

(51) Int. Cl.
| | |
|---|---|
| *H04M 3/00* | (2006.01) |
| *H04M 3/51* | (2006.01) |
| *H04M 3/523* | (2006.01) |
| *G06Q 30/00* | (2012.01) |

(52) U.S. Cl.
CPC ...... *H04M 3/5175* (2013.01); *G06Q 30/0185* (2013.01); *H04M 3/5191* (2013.01); *H04M 3/5237* (2013.01)

(58) Field of Classification Search
CPC ............. H04M 3/5191; H04M 3/5183; H04M 3/5166; H04M 3/5175; H04M 3/5232; H04M 3/5125

USPC ............... 379/265.06, 265.09, 266.09
See application file for complete search history.

(56) References Cited

U.S. PATENT DOCUMENTS

| | | | | |
|---|---|---|---|---|
| 7,664,641 B1* | 2/2010 | Pettay | ..................... | G10L 25/48 704/246 |
| 2005/0160330 A1* | 7/2005 | Embree | ................ | G06Q 30/016 714/57 |
| 2009/0164199 A1* | 6/2009 | Amidon | ........... | H04N 21/25891 703/17 |
| 2014/0314212 A1* | 10/2014 | Bentley | ................ | H04M 3/5116 379/38 |
| 2019/0109803 A1* | 4/2019 | Akkiraju | ................. | H04M 3/51 |

\* cited by examiner

*Primary Examiner* — Rasha S Al Aubaidi
(74) *Attorney, Agent, or Firm* — Patent Ingenuity, P.C.; Samuel K. Simpson

(57) ABSTRACT

A process generates, at a computer-implemented service provider platform, a simulated user request for a service. Further, the process sends, from the computer-implemented service provider platform to a computing device associated with an agent, the simulated user request for a service. Additionally, the process performs, with a processor at the computer-implemented service provider platform, an assessment of agent responsiveness to the simulated user request for the service. Finally, the process automatically generates, with the processor at the computer-implemented service provider platform, one or more actions based on the assessment.

20 Claims, 9 Drawing Sheets

TESTING CONFIGURATION FOR ASSESSING USER-AGENT COMMUNICATION

BACKGROUND

1. Field

This disclosure generally relates to the field of computing systems. More particularly, the disclosure relates to computer-implemented testing configurations.

2. General Background

Conventional configurations typically provide one or more services (e.g., language interpretation, banking, insurance, etc.) via one or more human agents situated onsite at, or remote to, a physical call center. For instance, a user requesting a service may place a telephone call to the call center, and a computerized routing system associated with the call center may route the telephone call to an agent, onsite or remote, so that the agent may perform the service for the user. The agent is often in what is referred to as "continuous mode," which allows the agent to receive an indication that a call is inbound via a screen pop-up and/or a tone emitted via an audio emission device (e.g., headset, telephone, etc.). Typically, that indication via the screen pop-up and/or audio tone is the only indication that the agent receives indicating that a call is inbound.

Yet, once the telephone call is routed to the particular agent, that agent may not be immediately present. For example, the agent may have taken a break, leaving the customer waiting for the agent to answer the phone for a time period that exceeds acceptable norms. Alternatively, the agent may not be present at all to answer the phone call. The computerized routing system may believe that it has connected the customer of the inbound call to an active agent, when in reality the customer has been connected to blank audio and/or background noise.

As yet another complication, the person answering the communication may not even be the actual agent—particularly in the case of an at-home agent (i.e., a family member or friend of the agent may be answering communications on behalf of the agent). And even if the actual agent promptly answers the telephone call, the agent may not perform his or her substantive responsibilities in accordance with the service provider's policies. For example, the agent may be required to read a particular introduction, as required by service provider policy, prior to rendering the service for the user, but may read that introduction incorrectly (e.g., too much of a delay, improper enunciation, improper wording, etc.).

Furthermore, sometimes the connectivity issue is not tied to any inaction or action by the agent, but rather external factors. For example, the equipment (e.g., computing device, telephone, etc.) or infrastructure (e.g., network) utilized by the agent may be experiencing technical difficulties. As another example, environmental factors (e.g., natural disasters, inclement weather, construction, etc.) may lead to ambient noise in a communication between an agent and a user.

Whether the communication issue between the agent and the user is agent-driven or external factor-driven, user dissatisfaction results when users cannot obtain high-quality connections to agents for services. For example, the only recourse for the user is to disconnect from the current telephone call, and call in again to speak with a different agent, which leads to customer frustration.

Adding further complication, conventional service provider platforms often have difficulty assessing the foregoing user-agent communication issues. For example, conventional service provider platforms often do not record communications between a user and an agent out of concern that the communications may include personally identifiable information ("PII"). To avoid the potential security risks of recording communications in which the user or agent may enunciate sensitive personal information of the user, many conventional service provider platforms opt to not allow for recording of user-agent communications. Yet, by not recording such communications, conventional service provider platforms forego the ability to analyze the content of user-agent communications to determine potential agent, and/or external factor, issues for rectification.

As a result, conventional service provider platforms do not effectively assess user-agent communications for agent-related inefficiencies or external factors that potentially diminish the quality of the user-agent communications.

SUMMARY

A process generates, at a computer-implemented service provider platform, a simulated user request for a service. Further, the process sends, from the computer-implemented service provider platform to a computing device associated with an agent, the simulated user request for the service. Additionally, the process performs, with a processor at the computer-implemented service provider platform, an assessment of agent responsiveness to the simulated user request for the service. Finally, the process automatically generates, with the processor at the computer-implemented service provider platform, one or more actions based on the assessment.

As another alternative, a computer program product may have a computer readable storage device with a computer readable program stored thereon that implements the functionality of the aforementioned process. As yet another alternative, a system may implement the process via various componentry of a computer-implemented service provider platform.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1:
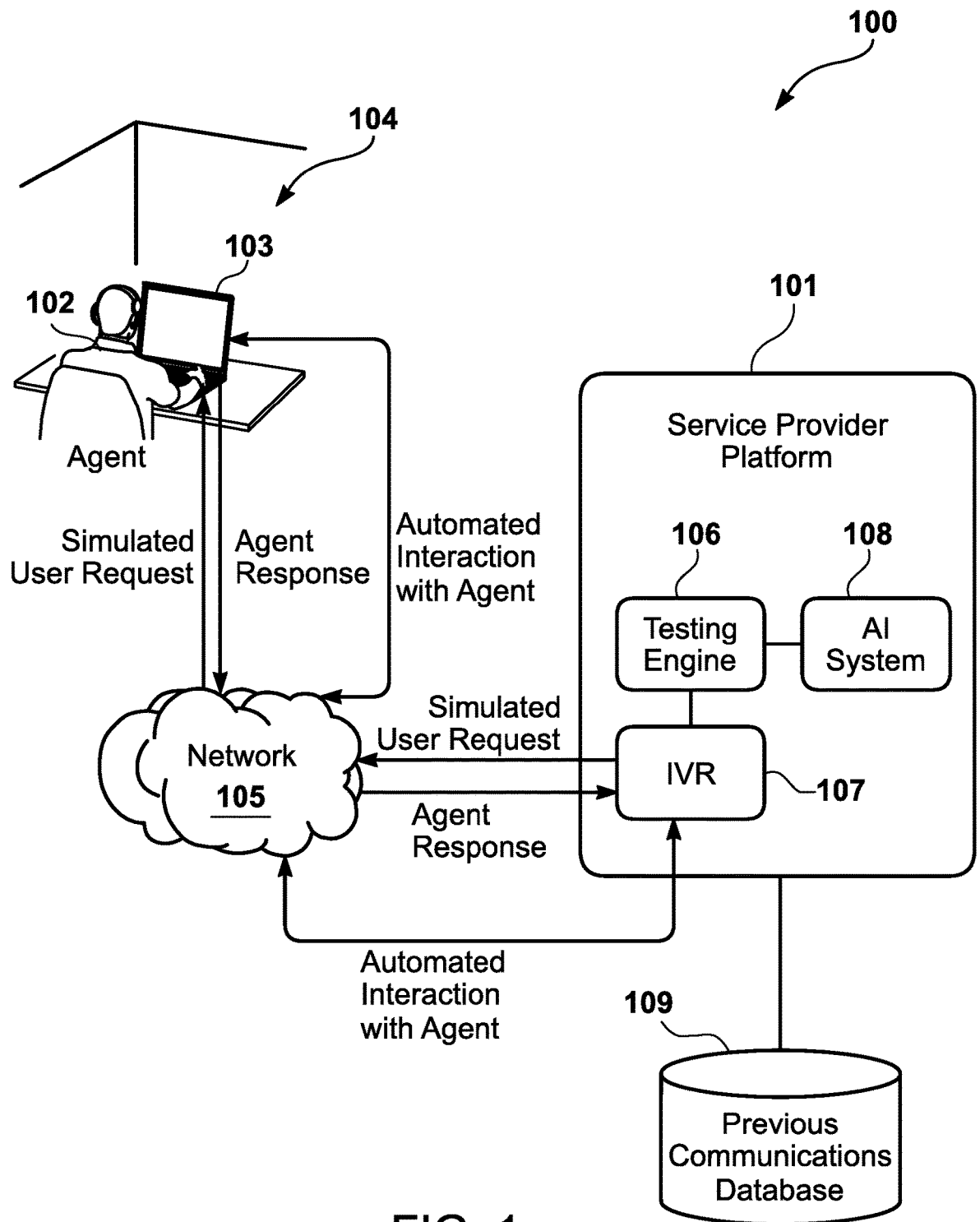
FIG. 1 illustrates a testing system that may be utilized to assess a user-agent communication.

A testing configuration is provided to assess a user-agent communication. In particular, the testing configuration may generate a simulated user request to be sent to a live agent that is supposed to provide communication handling (e.g., telephone call, chats, video, etc.) on behalf of a service provider. The simulated user request is routed to a live agent to provide the appearance of a live user request, yet, in actuality, the simulated user request is automatically generated by the service provider platform without a human user performing the request. Accordingly, at the outset of the user-agent communication, the agent should answer the communication as if a live user was performing the request for a service (e.g., answer a telephone call within a reasonable amount of time and provide an introduction as required by service provider policy). Furthermore, the simulated user request may have a test message that is provided to the agent, possibly only after the agent has answered the communication and provided an agent introduction, at which point the agent may deduce that the request was from a simulated user, rather than an actual live user. But at that point, the testing configuration has already assessed agent response time, communication (e.g., audio, video, text) quality, and/or compliance with service provider policies (e.g., agent reading of service provider introduction).

Moreover, because the testing configuration generates a simulated user request rather than a request from an actual, live user, the testing configuration is able to maintain adequate control to ensure that no PII is provided during the assessment. As a result, the testing configuration may record interactions between the agent and the simulated user without any concern regarding PII security.

Further, the testing configuration may provide live recommendations to the agent as to how to rectify agent-related issues stemming from the assessment. For example, the testing configuration may determine that the agent is not reading the service provider introduction promptly enough, or with enough clarity. Accordingly, the testing configuration may provide interactive recommendations to the agent as to how to improve for future user-agent communications. For instance, the testing configuration may utilize an artificial intelligence ("AI") system that utilizes machine learning to determine what recommendations led to the most successful results with the same and/or other agents participating in previous simulated user-agent communications. As another alternative, the testing configuration may lock out the agent from the system until the testing configuration determines an appropriate action.

Additionally, or alternatively, the testing configuration may interact with the agent to assess potential external factors that affect the quality of the simulated user-agent communication. For example, the testing configuration may prompt the agent, via a series of interactive questions, as to potential connectivity or ambient noise issues. Utilizing such agent feedback, the testing configuration can attempt to fix such external issues (e.g., issuing a request to another computing device to assess network connectivity issues and rectify any such issues).

Finally, the testing configuration may be implemented via a variety of modalities. Accordingly, the term communication is intended herein to include at least the following modalities: voice, video, and chat.

FIG. 1 illustrates a testing system 100 that may be utilized to assess a user-agent communication. In particular, the testing system 100 may have a computer-implemented service provider platform 101 which may communicate with an agent 102 via a corresponding agent computing device (e.g., personal computer ("PC"), laptop computer, smartphone, tablet device, etc.) through a network 105. As opposed to routing a communication (e.g., voice call, video communication, chat message, etc.) from a live, actual user to the agent 102 to fulfill a live service request, the computer-implemented service provider platform 101 may be configured to generate a test communication in the form of a simulated user request. Unbeknownst to the agent 102, the test communication is an automatically generated communication that appears to be from an actual, live user. As such, the agent 102 will be inclined to respond, or not respond, to the test communication in a similar manner as he or he she would respond to a communication of an actual, live user. Accordingly, the computer-implemented service provider platform 101 may utilize a testing engine 106 to perform an assessment of agent responsiveness (i.e., a lack of response, the manner in which the agent 102 responds to the simulated user request, etc.).

In one embodiment, the testing engine 106 determines if the agent 102 responds to the simulated user request within a predetermined time threshold. For example, the testing engine 106 may determine if the agent 102 answers the routed communication, with the simulated user request, within a time period such as thirty seconds. (Other time periods may be used for the predetermined time threshold.) If the agent 102 does not answer the routed communication within the predetermined time threshold, the testing engine 106 may assess that the agent 102 has indicated online availability for answering communications, but is not present at his or her agent computing device 103. As a result, the testing engine 106 may determine that the agent account associated with the agent 102 should be temporarily locked out.

If the agent 102 answers the routed communication, the testing engine 106 may determine if the agent 102 promptly provides an introduction. For example, the testing engine 106 may assess that an introduction emitted in an amount of time that exceeds a predetermined time threshold (e.g., fifteen seconds) is non-compliant. Accordingly, the testing engine 106 may take one of a number of actions (e.g., agent account lockout, one or more interactive recommendations provided to the agent 102 to improve response time, etc.). Accordingly, the service provider platform 101 preempts agent self-imposed delays.

Furthermore, if the agent 102 answers the routed communication promptly, the testing engine 106 may perform an interactive assessment, via an interactive voice response system ("IVR") 107, with the agent 102 to determine if the quality of communications with the agent 102 may be improved in any way. For example, the testing engine 106 may prompt the agent 102 to indicate any technical difficulties that the agent 102 has been having during the communication (e.g., technical difficulty with agent equipment, bandwidth speed, ambient noise, etc.). The testing engine 106 may then assess how the computer-implemented service provider platform 101 may optimally help improve future communications for the agent 102. For example, if the testing engine 106 determines that the agent 102 is experiencing difficulty using equipment, the testing engine 106 may provide a tutorial (e.g., video, voice instructions via the IVR 107, etc.) to help improve the use of the equipment by the agent 102, or potentially help the agent 102 place an order for new equipment upon further testing by the testing engine 106 that the equipment of the agent 102 is performing in less than an optimal manner. As another example, if the agent 102 reports network bandwidth issues (e.g., slow network connectivity), the testing engine 106 may send a communication to one or more computing devices to investigate and resolve the network latency.

In one embodiment, the testing engine 106 randomly selects the agent 102 from a plurality of agents. As a result, the agent 102 is incentivized to provide optimal service to all users. Furthermore, the testing engine 106 may establish a baseline of data for a particular agent 102, which may be stored in a previous communications database 109. The AI system 108 may then retrieve data, applicable to the particular agent 102 and/or other agents in similar contexts (e.g., language interpreters that perform language interpretation for a similar language pair to that of the agent 102) from the previous communication database 109 to generate one or more recommendations for the agent 102 to improve the experience provided to users. Furthermore, the testing engine 106 may add the current communication (e.g., recording of voice call, video communication, chat session, etc.) to the previous communication database 109 for subsequent machine learning by the AI system 108. By controlling the flow of communication, the testing engine 106 may ensure that no PII is recorded for storage in the previous communications database 109.

In another embodiment, the testing engine 106 selects the agent 102 based on one or more inferred signals, rather than in a random manner. For example, the testing engine 106 may determine that the particular agent 102 has an abnormally high frequency (i.e., exceeding a predetermined frequency threshold) of communications that are of a duration considered to be short (i.e., being less than a predetermined time threshold). As another example of an inferred signal, the testing engine 106 may determine that the amount of data gathered by the particular agent 102 is less than a predetermined data aggregation threshold. For example, the agent 102 may have only entered/accessed data for ten calls into/in the service provider platform 101 on a given day, when forty calls was the average amount for other agents on that day. As yet another example, a quantity of customer complaints about the particular agent 102 exceeding a predetermined complaint threshold may also be an inferred signal.

Furthermore, the testing engine 106 may be tunable to limit how often the particular agent 102 is sent a user simulated request. For example, the AI system 108, illustrated in FIG. 1, may perform machine learning to track the progress of the agent 102. If the agent 102 is demonstrating an increased rate of agent responsiveness to user simulated requests, the testing engine 106 may reduce the quantity of user simulated requests sent to that agent 102. Conversely, if the agent 102 is demonstrating a decreased rate of agent responsiveness to user simulated requests, the testing engine 106 may increase the quantity of user simulated requests sent to the agent 102.

Figure 2:
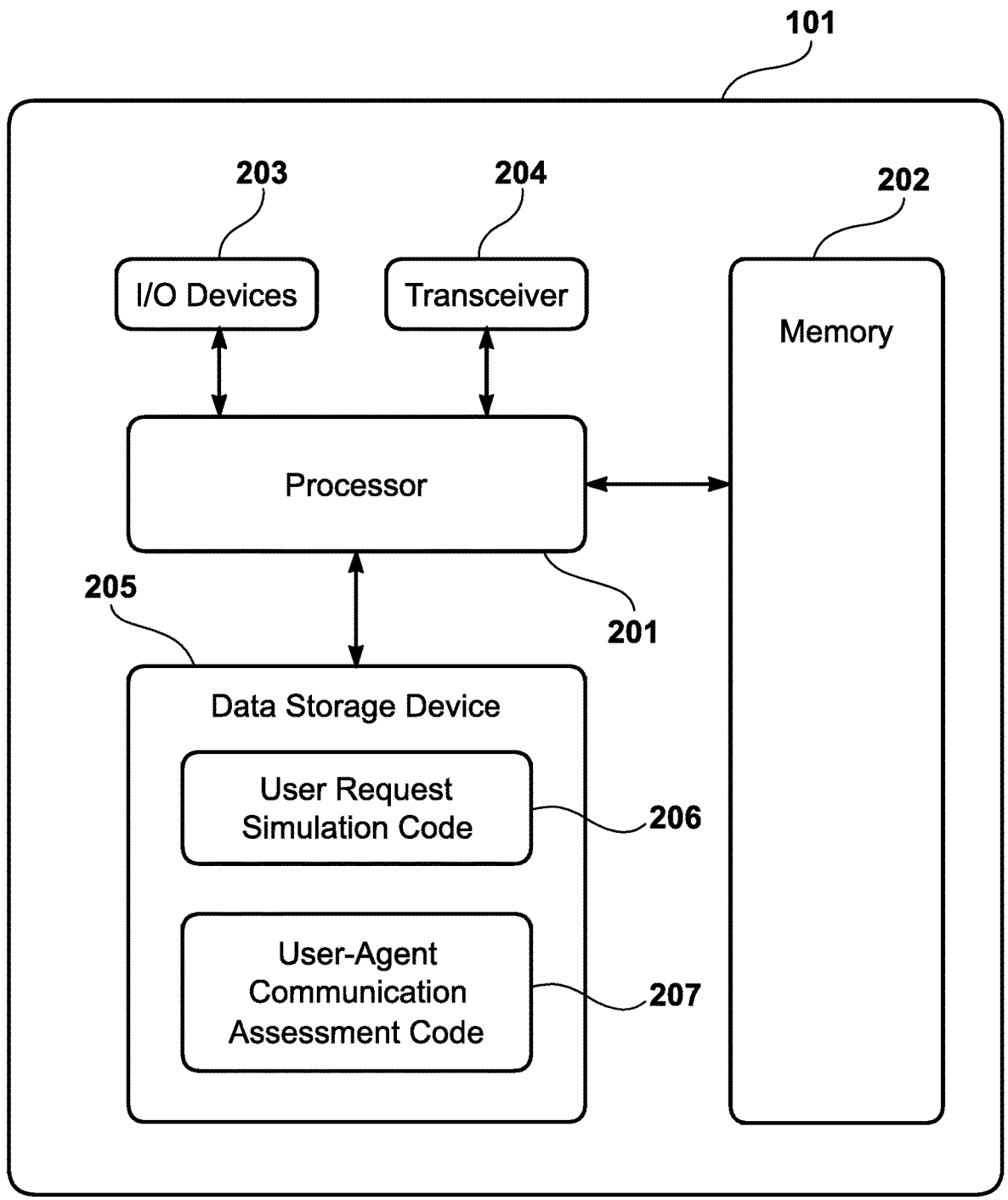
FIG. 2 illustrates a configuration of the internal components of the computer-implemented service provider platform illustrated in FIG. 1.

FIG. 2 illustrates a configuration of the internal components of the computer-implemented service provider platform 101 illustrated in FIG. 1. In particular, the computer-implemented service provider platform 101 may have a processor 201, which may be specialized for simulating user requests and/or performing user-agent communication assessments. Furthermore, the processor 201 may be in operable communication with a memory device 202.

Moreover, the computer-implemented service provider platform 101 may have a data storage device 205 that stores user request simulation code 206 and user-agent communication assessment code 207. The processor 201 may retrieve the user request simulation code 206 for execution in the memory device 202 to generate a simulated user request. The processor 201 may execute the user request simulation code 206 to generate a communication that appears to be from an actual human user, but in actuality is an automatically generated request from the testing engine 106. Furthermore, the processor 201 may retrieve the user-agent communication assessment code 207 for execution in the memory device 202 to generate a user-agent communication assessment. As an example, the processor 201 may perform an audio analysis to compare audio captured from the agent 102, in response to the simulated user request, with baseline audio that was previously captured from the agent 102 (e.g., in an onboarding process when the agent is first hired, in a response to a previous simulated user request, etc.). As another example, the processor 201 may perform an image analysis to compare imagery captured of the agent 102, in response to the simulated user request, with baseline imagery that was previously captured from the agent. As yet another example, the processor 201 may perform a syntactic analysis, via natural language processing ("NLP"), on a textual response (e.g., via chat) provided by the agent with a baseline writing style of the agent.

Moreover, the computer-implemented service provider platform 101 may also have a transceiver 204, which it may use to send and receive communications over the network 105 to, or from, the agent computing device 103. (Alternatively, a separate transmitter and receiver may be used in place of the transceiver 204.)

In addition, the computer-implemented service provider platform 101 may have one or more input/output ("I/O") devices 203 (e.g., touch-screen interface, keyboard, microphone, etc.) that may be used to receive inputs and emit outputs.

Figure 3A:
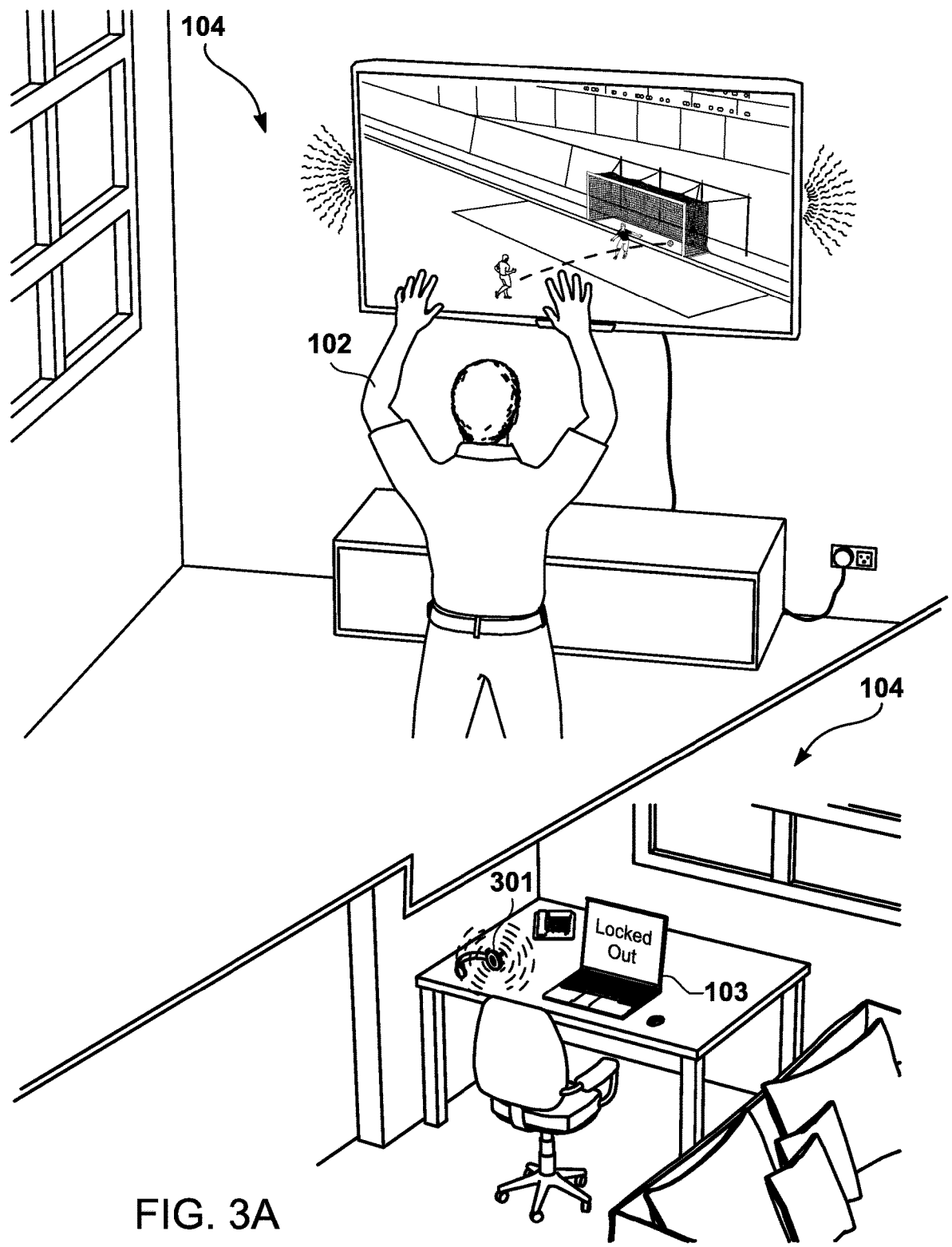
FIG. 3A illustrates a physical environment in which the agent is supposed to be working on behalf of the service provider.

FIGS. 3A-3D illustrate examples of a voice-based configuration of the computer-implemented service provider platform 101. In particular, FIG. 3A illustrates a physical environment 104 (e.g., a living room of the agent 102) in which the agent 102 is supposed to be working on behalf of the service provider. For instance, the agent 102 may be a language interpreter that interprets/translates between two different languages on behalf of a language interpretation provider. For example, an English-speaking person and a Spanish-speaking person may want to communicate with one another; to understand one another, they may place a voice call to the language interpretation provider, which routes the telephone call to the agent 102 in his or her home, where he or she may interpret/translate the English utterances into Spanish, and the Spanish utterances into English. Accordingly, the agent 102 awaits voice communications to perform English-Spanish language interpretations/translations over the phone (over the phone interpretation ("OPI")). (English-Spanish is just one example of a language pair; other language pairs may be interpreted/translated.) The agent 102 may also have a particular skill set (e.g., banking, insurance, medical, etc.) so that language interpretations/translations from a particular environment are handled by the agent 102. Alternatively, the agent 102 may be a customer care agent for that particular skill set, without performing any language interpretation/translation.

The agent 102 may have various equipment, such as a computing device 103 (e.g., PC, laptop computer, smartphone, tablet device, smartwatch, etc.) and a communication device 301 (e.g., headset, telephone, etc.), that he or she utilizes to receive incoming phone calls, and perform the requested service (e.g., language interpretation). (Alternatively, the computing device 103 and the communication device 301 may be integrated into one single device (e.g., smartphone) rather than two distinct devices.) When the agent 102 is logged in, via the computing device 103, via an agent account hosted by the computer-implemented service provider platform 101, the agent 102 is expected to be ready to accept incoming phone calls and perform the requested service. To prevent the agent 102 from performing other tasks (e.g., leisurely activities such as watching television) within, or outside of, his or her home while being logged into the agent account, the computer-implemented service provider platform 101 may generate a voice-based simulated user request for a service (e.g., live language interpretation). For example, in one embodiment, the simulated user request may be a pre-generated message that is only played back to the agent 102 after the agent 102 answers the phone call and provides a greeting. In other words, the agent 102 answers the phone call thinking that an actual user has placed the phone call, which allows the testing engine 106 to measure both response time of the agent 102 answering the phone call and the manner in which the agent 102 provides the voice greeting. To detect when the user simulated request should be invoked, the testing engine 106 may utilize the IVR 107 to wait for a voice-based user response from the agent 102, and determine when the agent 102 has completed his or her response. In another embodiment, the simulated user request may be a pre-generated message that is played back to the agent 102 at the outset, even before the agent 102 has provided a greeting.

In measuring the response time of the agent 102, the testing engine 106 may allocate a predetermined time threshold in which the agent 102 has to answer the phone call. If the agent 102 does not answer the phone call within that predetermined time threshold, the testing engine 106 may assess that the agent 102 is not physically present at his or her equipment to be actively participating in providing a service, such as a language interpretation session. For example, as illustrated in FIG. 3A, the agent 102 may be in another part of his or her home, other than the physical environment 104 (e.g., living room) in which the equipment of the agent 102 is positioned. The agent 102 may be involved in an activity (e.g., watching television) in which he or she cannot hear the communication device 301 ringing. As a result, a potential user telephone call for a service (e.g., language interpretation/translation) would have been routed to the agent 102, who is not operating his or her equipment, and the potential user would have not received the requested service. Instead, the potential user would have had to call he service provider again to be reconnected to another agent—a complication that is not conducive to user satisfaction.

To preempt the foregoing complication, the testing engine 106 may determine that the agent 102 did not answer the user simulated phone call within a predetermined amount of time (e.g., one minute); based on such assessment, the testing engine 106 may take one or more actions, such as generating an agent account lockout of the agent account.

Figure 3B:
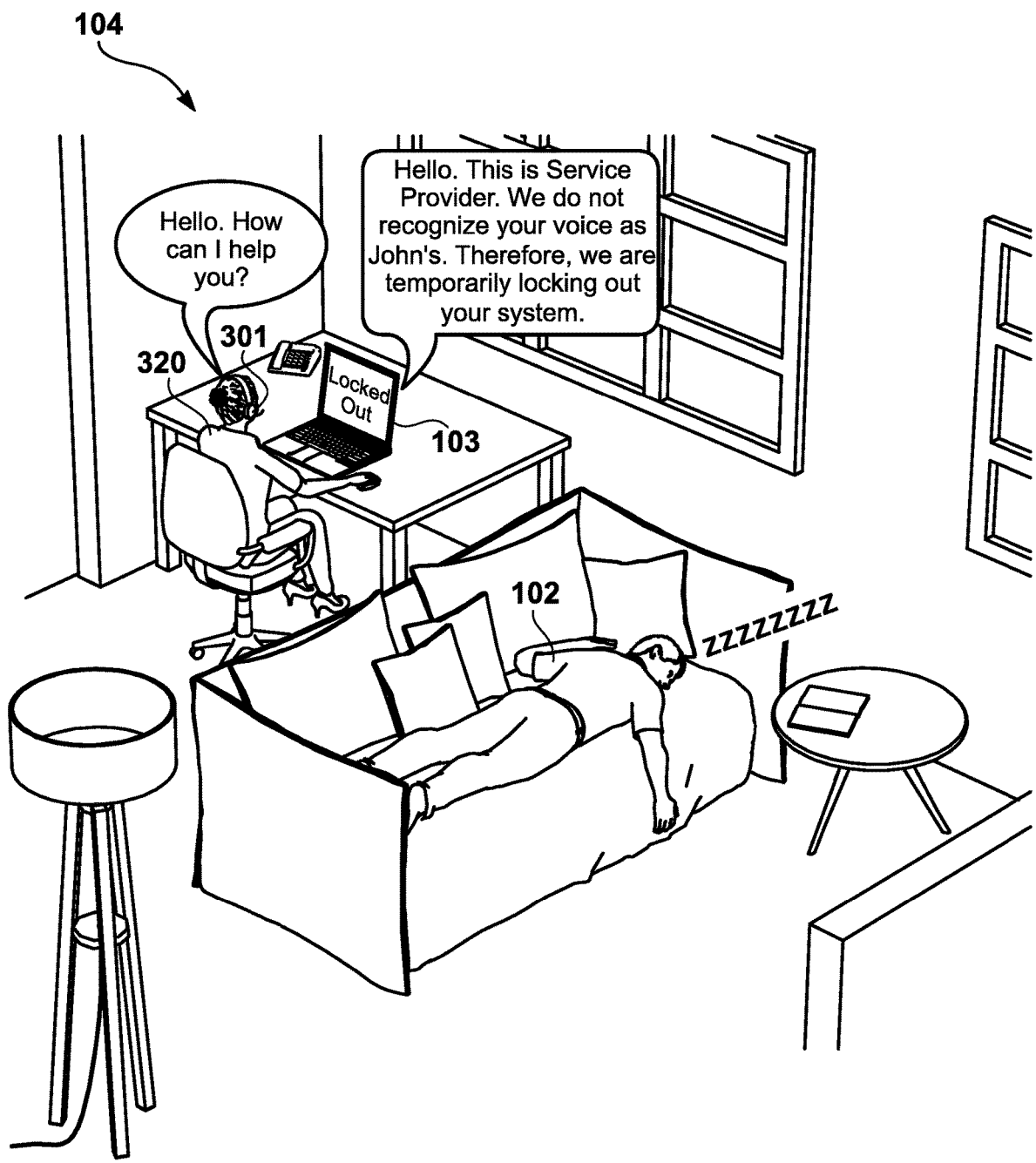
FIG. 3B illustrates a person working on behalf of the service provider, but the person is an imposter of the agent.

Alternatively, FIG. 3B illustrates a person working on behalf of the service provider, but the person is an imposter 320 of the agent 102. For example, the agent 102 may ask a family member or a friend to perform the service on behalf of the agent 102. In the case of a language interpretation service, the family member or friend also may be fluent in the same human spoken languages as the agent 102, thereby allowing the imposter 320 to pretend to be the agent 102. However, such fraudulent activity lacks compliance with the quality control policies of the service provider. For example, the imposter 320 may not be trained to provide the introduction and/or customer assistance required by the service provider (potential hesitations, incorrect wording, incorrect tone, etc.).

To determine the potential for fraudulent agent call handling, the testing engine 106 may perform an audio analysis on the introduction uttered by the imposter 320 to compare it to baseline audio data from the agent 102. Upon determining that the audio introduction emitted by the imposter 320 is inconsistent with the baseline audio data previously recorded from the agent 102, the testing engine 106 may generate an agent account lockout of the agent account.

In other instances, the testing engine 106 may determine that the agent 102 is operating his or her equipment within the predetermined time threshold, but that the introduction uttered by the agent 102 necessitates improvement for quality control purposes. For example, the agent 102 may provide a delayed introduction after answering a phone call, potentially hoping that the user disconnects to avoid having to perform work. Accordingly, the testing engine 106 may generate an agent account lockout upon lack of a detection of the introduction within a predetermined time period. As another example, the agent 102 may provide an introduction within the correct period of time, but may not be stating the introduction according to a service provider policy (e.g., proper enunciation, clarity, wording, etc.). Accordingly, in this instance, the testing engine 106 may take actions other than an agent account lockout, such as interactive coaching via the IVR 107 as to how to improve the introduction.

Figure 3C:
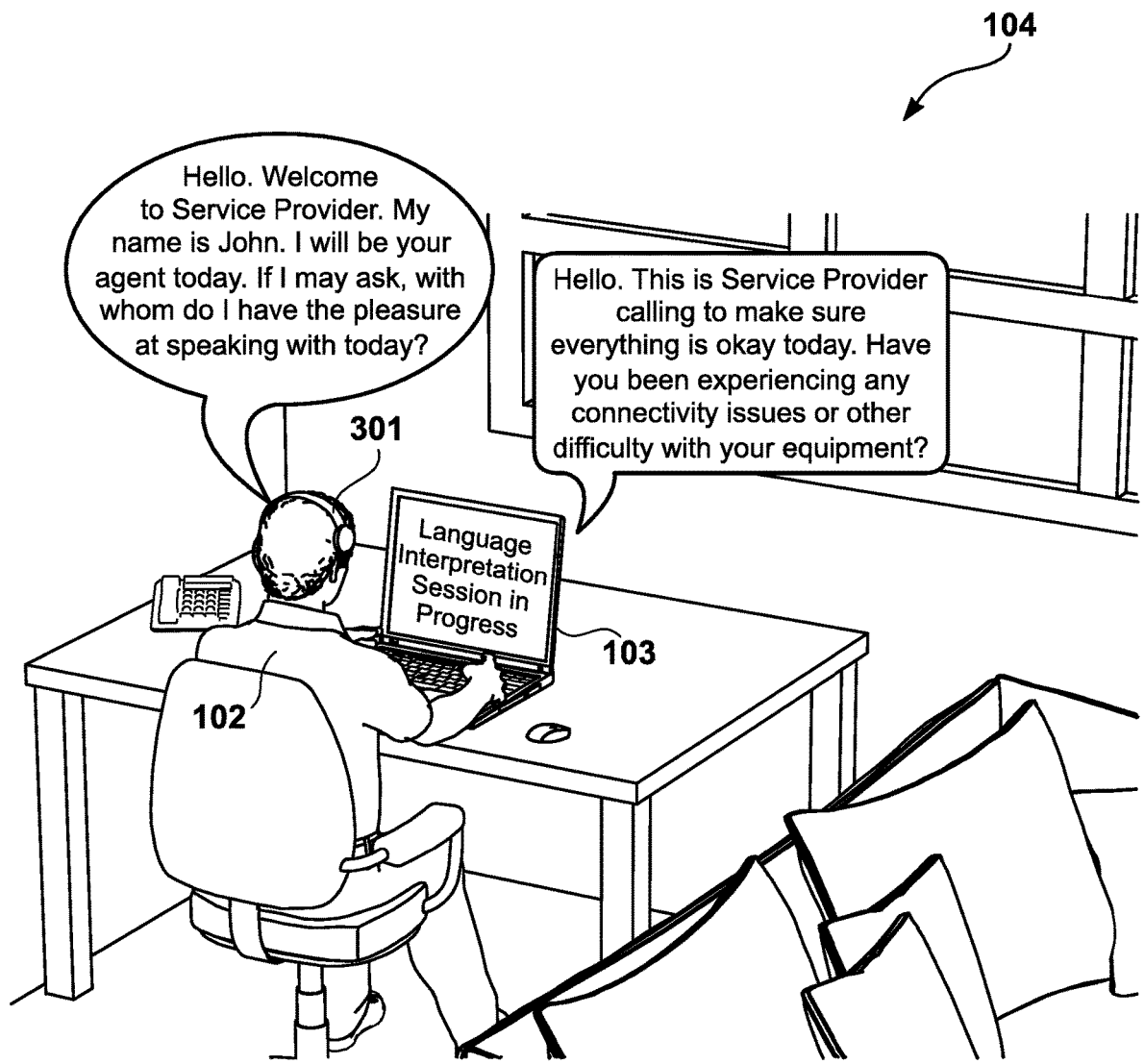
FIG. 3C illustrates the testing engine assessing that a quality control issue independent of the agent should be resolved.

As another alternative, which is illustrated in FIG. 3C, the testing engine 106 may assess that a quality control issue independent of the agent 102 should be resolved. For example, the testing engine 106 may prompt the user 102 with one or more questions, via the IVR 107, to determine potential external factors that have led to the quality control issue. As an example, the testing engine 106 may determine, based upon answers to the prompts, that the agent 102 is experiencing technical difficulties (e.g., low audio levels) based on his or her equipment. The testing engine 106 may then provide interactive coaching (i.e., via the IVR 107) to help correct the technical difficulties (e.g., step-by-step coaching to correct the low audio levels). If the agent 102 was having difficulty self-fixing the problem, the testing engine 106 may route the communication to a support technician to provide interactive coaching via a conference call or video conference. As another example, the testing engine 106 may determine, based upon answers to the prompts, that network bandwidth issues may be causing connectivity issues for the agent 102. The testing engine 106 may then send a request to another computing device to correct the connectivity issue. As yet another example, the testing engine 106 may determine, based upon answers to the prompts, that an environmental factor (e.g., natural disaster, heavy rain, ambient noise from other people or agents in the physical environment 104) is causing a quality control issue; in such an instance, the testing engine 106 may temporarily reroute communications to other agents that are not subject to those same environmental conditions.

Figure 3D:
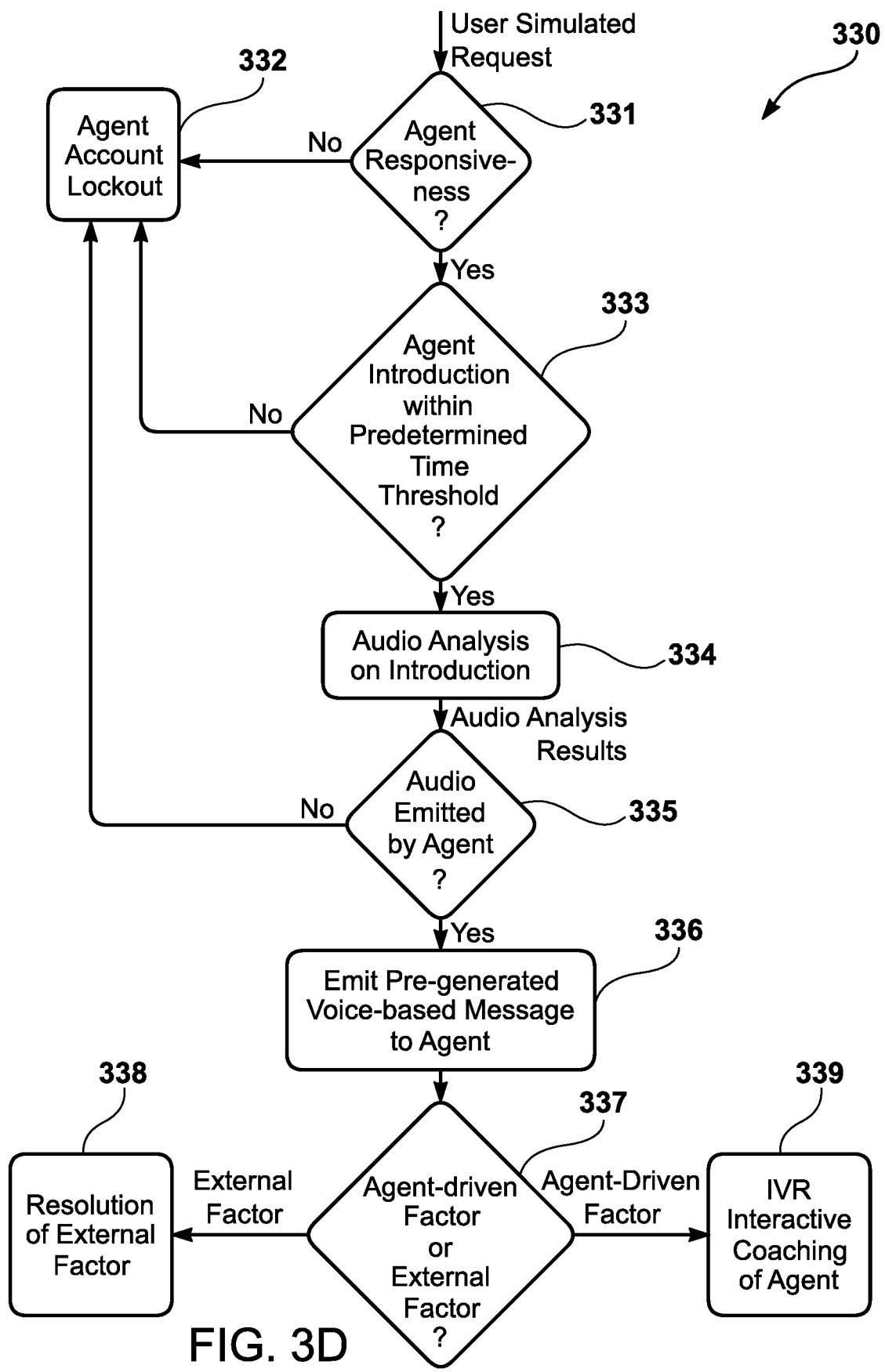
FIG. 3D illustrates a testing process that may be utilized by the testing engine to perform a sequence of operations, directed to quality control of voice-based communication handling by the agent.

Accordingly, the testing engine 106 may perform a sequence of operations, illustrated by a testing process 330 in FIG. 3D, directed to quality control of voice-based communication handling by the agent 102. Firstly, at a decision block 331, the testing engine 106 may test for a lack of agent responsiveness to the user simulated phone call. Upon determining a lack of agent responsiveness, at a process block 332, the testing engine 106 may perform an agent account lockout. Conversely, upon the agent 102 responding within a predetermined time threshold, the testing engine 106 may determine, at a decision block 333, if the agent 102 provides an introduction within another predetermined time threshold, and perform an agent account lockout, or other action, if the introduction is provided at a time that exceeds the additional predetermined time threshold. Conversely, if the agent 102 provides the introduction within the predetermined time threshold, the testing engine 106 may perform, at a process block 334, an audio analysis on the introduction, and determines, at a decision block 335, if the audio was emitted by the agent 102, or potentially an imposter 320; the testing engine 106 performs an agent account lockout upon a fraudulent activity determination of activity by an imposter 320. But if the testing engine 106 determines, at the decision block 335, that the agent 102 is the correct person providing the introduction, the testing engine 106 may emit, at a process block 336, a pre-generated voice-based message to the agent 102 indicating the presence of the testing engine 106 in routing the user simulated request. Subsequent to providing the pre-generated voice-based message, the testing engine 106 may interact with the agent 102, at a decision block 337, through the IVR 107, in a customized manner particular to the agent 102 and given situation, to determine how to improve the quality of the experience provided by the agent 102, whether that be an improvement to performance by the agent 102, at a process block 338 (e.g., automated interactive coaching of the agent 102 via the IVR 107) or resolution of an external factor, at a process block 339 (e.g., message sent to a distinct computing device to correct network connectivity issue). Therefore, the sequence of operations performed by the testing engine 106 may include an internal analysis (e.g., audio analysis), emission of a pre-generated message, and automated interaction with the agent 102. (The testing process 330 is illustrated for a voice-based system, as an example, but alternatively may be utilized for other modalities (e.g., video with video analysis and/or video interactive coaching, chat session with textual analysis and/or textual interactive coaching.)

Although the physical environment 104 is illustrated as a living room, other physical environments may be utilized. For example, the physical environment 104 may be a contact center (e.g., call center) in which the agent 102 is situated next to other agents, but in which human supervisors may not be able to feasibly monitor quality control.

Figure 4:
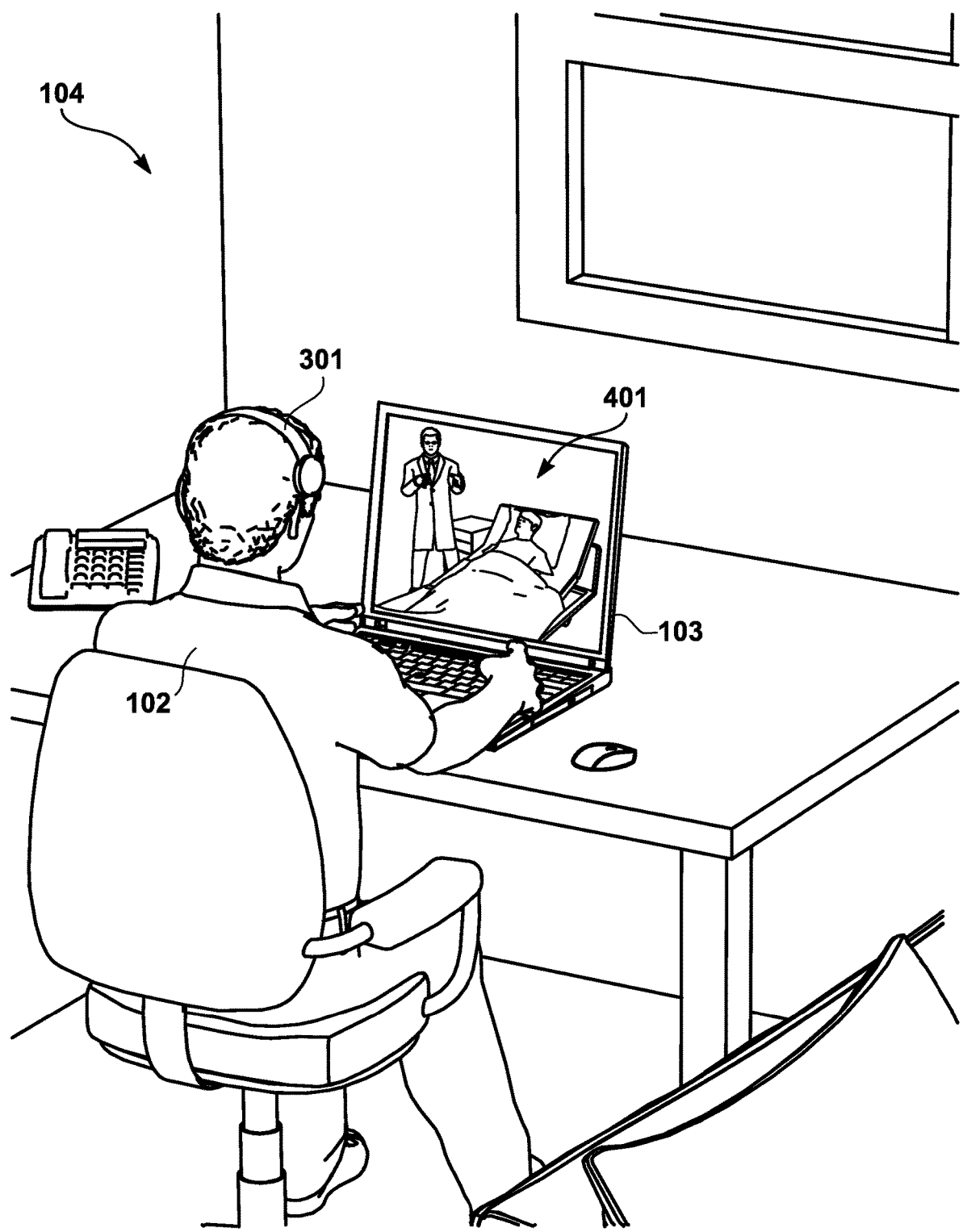
FIG. 4 illustrates an example of a video-based configuration of the computer-implemented service provider platform illustrated in FIG. 1.

FIG. 4 illustrates an example of a video-based configuration of the computer-implemented service provider platform 101 illustrated in FIG. 1. In particular, the testing engine 106 may send a video clip 401 corresponding to a simulated video-based user request for a service. For example, the testing engine 106 may randomly retrieve, from a video clips database, a pre-recorded video clip of a doctor and a patient in a hospital room seeking a language interpreter to interpret their communication. Since the video clip 401 provides the appearance of an actual user request, the agent 102 may be inclined to provide the introduction that he or she would normally give in an actual live language interpretation session. Upon completion of the introduction, the testing engine 106 may send a graphical representation of an avatar to the agent computing device 103 to correspond to interactive coaching provided by the testing engine 106. Alternatively, the testing engine 106 may provide voice-based prompting in conjunction with a blank screen or screen with text. Various configurations may be implemented to allow for video and/or other modalities to be presented to the agent 102 after the video clip 106.

Figure 5:
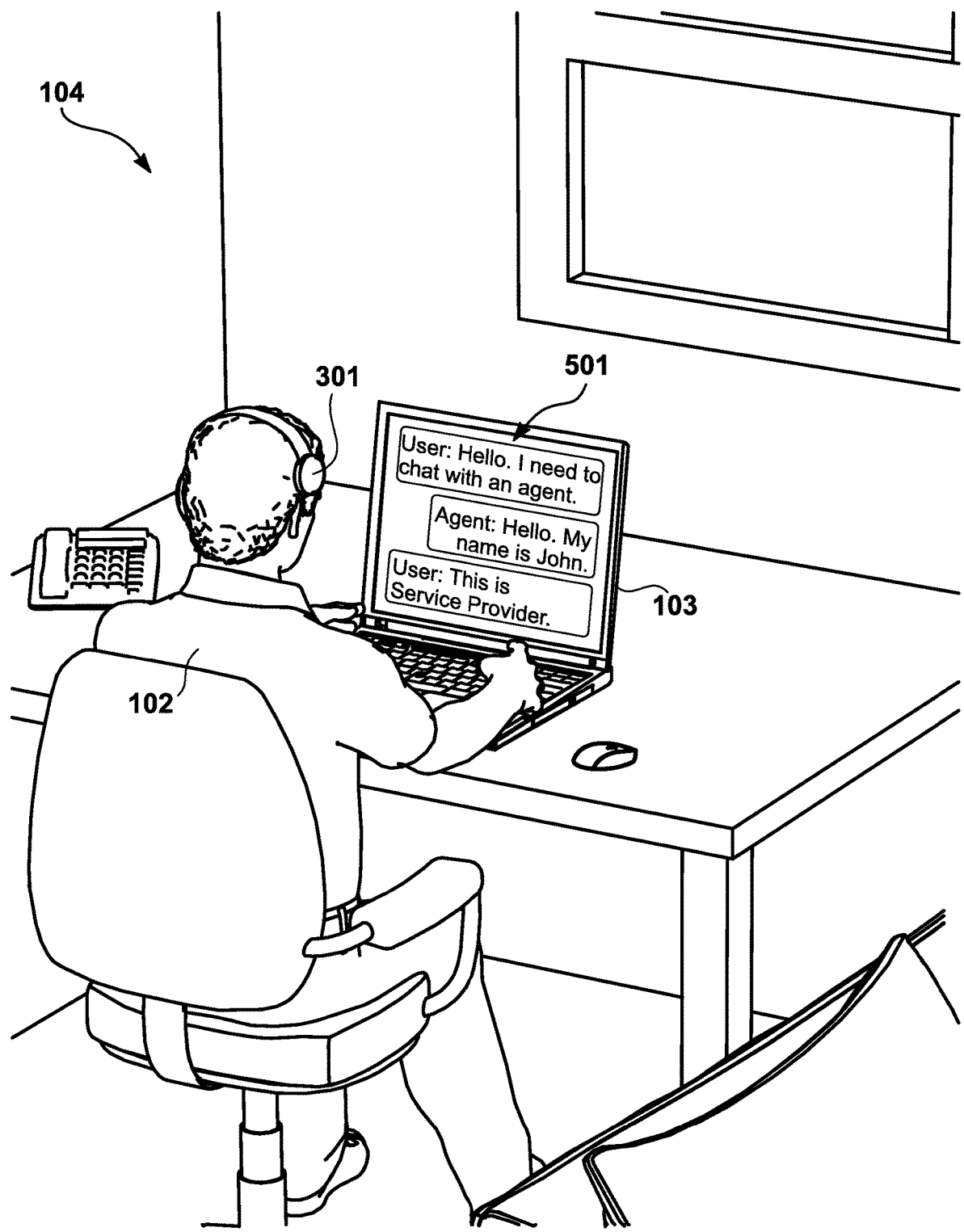
FIG. 5 illustrates an example of a text-based configuration of the computer-implemented service provider platform illustrated in FIG. 1.

Moreover, FIG. 5 illustrates an example of a text-based configuration of the computer-implemented service provider platform 101 illustrated in FIG. 1. Upon presenting a user-simulated chat request via a chat session 501, and receiving a response from the agent 102, the testing engine 106 may provide interactive coaching via the chat session 501.

Figure 6:
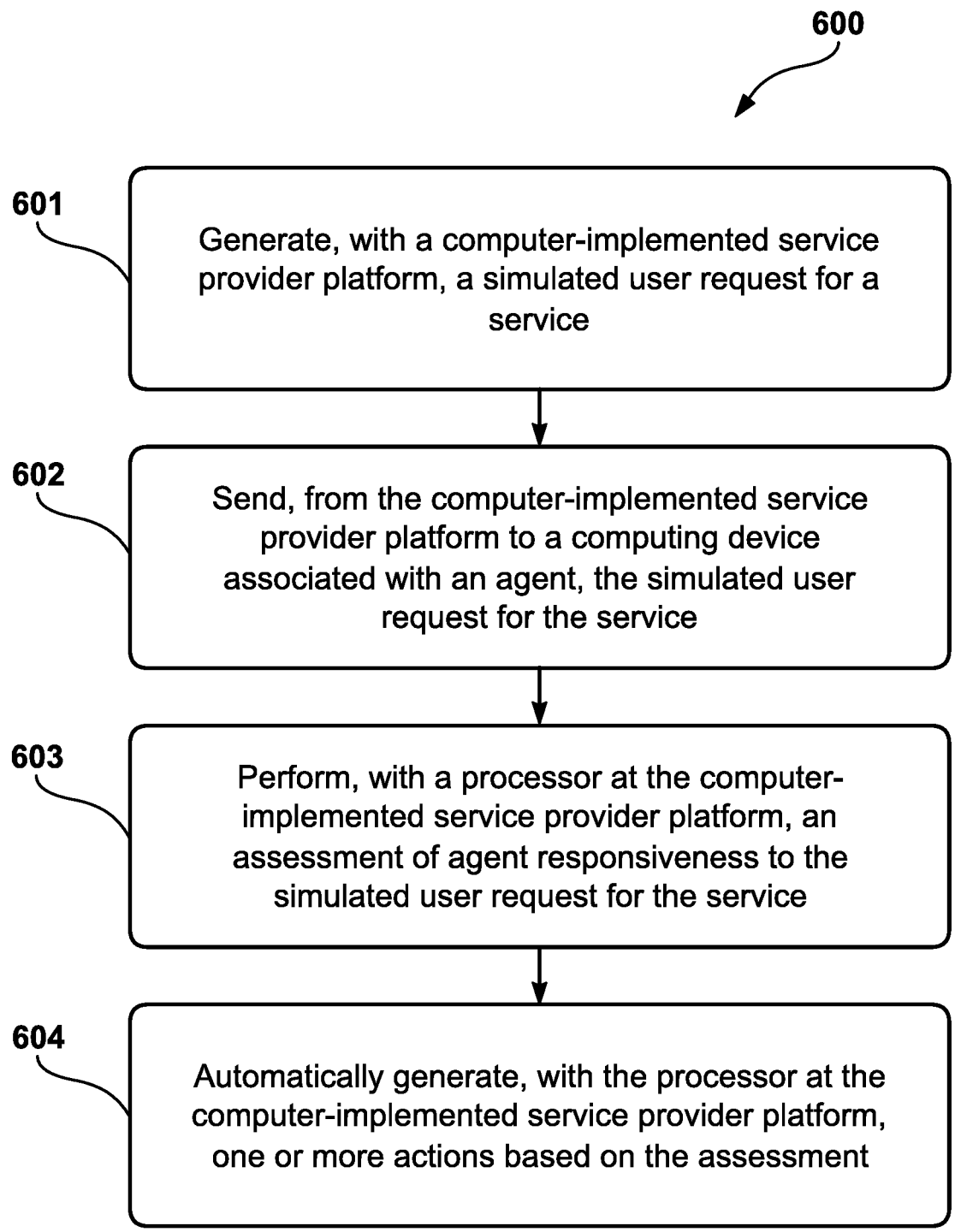
FIG. 6 illustrates a process that may be utilized by the computer-implemented service provider platform, illustrated in FIG. 1, to assess a user-agent communication.

FIG. 6 illustrates a process 600 that may be utilized by the computer-implemented service provider platform 101, illustrated in FIG. 1, to assess a user-agent communication. At a process block 601, the process 600 generates, at the computer-implemented service provider platform 101, a simulated user request for a service. Furthermore, at a process block 602, the process 600 sends, from the computer-implemented service provider platform 101 to a computing device 103 associated with an agent 102, the simulated user request for the service. Additionally, at a process block 603, the process 600 performs, with the processor 201 at the computer-implemented service provider platform 101, an assessment of agent responsiveness to the simulated user request for the service. Finally, at a process block 604, the process 600 automatically generates, with the processor 201 at the computer-implemented service provider platform 101, one or more actions based on the assessment.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a computer readable storage device having a computer readable program stored thereon, wherein the computer readable program when executed on a computer causes the computer to:

generate, at a computer-implemented service provider platform, a simulated user request for a service;

send, from the computer-implemented service provider platform to a computing device associated with an agent, the simulated user request for the service;

perform, with a processor at the computer-implemented service provider platform, an assessment of agent responsiveness to the simulated user request for the service prior to detection by the agent that the simulated user request is a simulation; and automatically generate, with the processor at the computer-implemented service provider platform, one or more actions based on the assessment.

2. The computer program product of claim 1, wherein the assessment is a lack of responsiveness to the simulated user request within a predetermined time period.

3. The computer program product of claim 2, wherein the one or more actions comprise performing a lockout of an agent account associated with the agent to prevent operation by the agent of a software application associated with the computer-implemented service provider platform.

4. The computer program product of claim 1, wherein the assessment is an audio analysis that compares audio emitted by the agent, in response to the simulated user request, with one or more audio recordings of audio previously emitted by the agent in previous communications in which the agent was a participant.

5. The computer program product of claim 4, wherein the one or more actions comprise performing a lockout of an agent account associated with the agent to prevent fraudulent operation by an imposter of the agent of a software application associated with the computer-implemented service provider platform based upon the audio analysis.

6. The computer program product of claim 4, wherein the computer is further caused to generate a recommendation to reduce ambient noise based upon the audio analysis.

7. The computer program product of claim 1, wherein the assessment is a comparison between an introduction emitted by the agent, in response to the simulated user request, with a predetermined introduction that complies with a service provider policy.

8. The computer program product of claim 7, wherein the one or more actions comprise providing one or more interactive recommendations, via an interactive response system, to modify the introduction based upon the assessment indicating that the introduction lacks compliance with the service provider policy outside of a predetermined confidence threshold.

9. The computer program product of claim 1, wherein the assessment is a technical evaluation of network infrastructure based upon an interaction, via an interactive response system, with the agent that indicates a connectivity problem.

10. The computer program product of claim 1, wherein the simulated user request is a predetermined audio message.

11. A computer program product of claim 1, wherein the simulated user request is a predetermined video clip.

12. The computer program product of claim 1, wherein the simulated user request is a predetermined chat message.

13. The computer program product of claim 1, wherein the one or more actions comprise performing machine learning, via an artificial intelligence system, based on an agent response to the simulated user request for one or more subsequent interactions between one or more additional agents.

14. A method comprising:
generating, at a computer-implemented service provider platform, a simulated user request for a service;
sending, from the computer-implemented service provider platform to a computing device associated with an agent, the simulated user request for the service;
performing, with a processor at the computer-implemented service provider platform, an assessment of agent responsiveness to the simulated user request for the service prior to detection by the agent that the simulated user request is a simulation; and
automatically generating, with the processor at the computer-implemented service provider platform, one or more actions based on the assessment.

15. The method of claim 14, wherein the assessment is a lack of responsiveness to the simulated user request within a predetermined time period.

16. The method of claim 15, wherein the one or more actions comprise performing a lockout of an agent account associated with the agent to prevent operation by the agent of a software application associated with the computer-implemented service provider platform.

17. The method of claim 14, wherein the assessment is an audio analysis that compares audio emitted by the agent, in response to the simulated user request, with one or more audio recordings of audio previously emitted by the agent in previous communications in which the agent was a participant.

18. The method of claim 17, wherein the one or more actions comprise performing a lockout of an agent account associated with the agent to prevent fraudulent operation by an imposter of the agent of a software application associated with the computer-implemented service provider platform based upon the audio analysis.

19. The method of claim 17, wherein the one or more actions comprise generating a recommendation to reduce ambient noise based upon the audio analysis.

20. The method of claim 14, wherein the assessment is a comparison between an introduction emitted by the agent, in response to the simulated user request, with a predetermined introduction that complies with a service provider policy.

* * * * *